(12) United States Patent
Guerra Barrena et al.

(10) Patent No.: US 9,643,886 B2
(45) Date of Patent: May 9, 2017

(54) CEMENT ADDITIVES AND RELATED METHODS OF USE

(71) Applicants: Roberto Agustin Guerra Barrena, Park City, UT (US); Roberto Agustin Guerro Guerrero, Park City, UT (US); Brad Wilson, Park City, UT (US); Dorn Schmidt, Park City, UT (US)

(72) Inventors: Roberto Agustin Guerra Barrena, Park City, UT (US); Roberto Agustin Guerro Guerrero, Park City, UT (US); Brad Wilson, Park City, UT (US); Dorn Schmidt, Park City, UT (US)

(73) Assignee: Advanced Concrete Solutions, LLC, Parker, CO (US)

( * ) Notice: Subject to any disclaimer, the term of this patent is extended or adjusted under 35 U.S.C. 154(b) by 0 days.

(21) Appl. No.: 14/962,677

(22) Filed: Dec. 8, 2015

(65) Prior Publication Data
US 2016/0168028 A1    Jun. 16, 2016

Related U.S. Application Data

(63) Continuation of application No. 14/350,337, filed as application No. PCT/US2012/059253 on Oct. 8, 2012, now abandoned.

(60) Provisional application No. 61/554,114, filed on Nov. 1, 2011.

(51) Int. Cl.
| | |
|---|---|
| *C04B 24/00* | (2006.01) |
| *C04B 28/04* | (2006.01) |
| *C04B 22/00* | (2006.01) |
| *C04B 7/48* | (2006.01) |
| *C04B 18/02* | (2006.01) |
| *C04B 28/24* | (2006.01) |

(52) U.S. Cl.
CPC .............. *C04B 24/001* (2013.01); *C04B 7/48* (2013.01); *C04B 18/02* (2013.01); *C04B 22/004* (2013.01); *C04B 28/04* (2013.01); *C04B 28/24* (2013.01); *Y02W 30/92* (2015.05)

(58) Field of Classification Search
CPC ....... C04B 28/04; C04B 28/24; C04B 24/001; C04B 24/10; C04B 7/48; C04B 18/02; C04B 18/08; C04B 22/004; C04B 14/108; C04B 14/28; C04B 14/14
See application file for complete search history.

(56) References Cited

U.S. PATENT DOCUMENTS

| | | | |
|---|---|---|---|
| 748,235 A | 12/1903 | Turner | |
| 2,311,288 A * | 2/1943 | Booth | C04B 24/001 |
| | | | 106/729 |
| 2,311,290 A * | 2/1943 | Booth | C04B 24/001 |
| | | | 106/729 |
| 3,307,957 A | 3/1967 | Tobler | |
| 3,698,911 A | 10/1972 | Pellegrini | |
| 3,857,715 A | 12/1974 | Humphrey | |
| 4,098,614 A | 7/1978 | Ray | |
| 4,961,789 A | 10/1990 | Barrenechea | |
| 5,961,712 A * | 10/1999 | Sun | C04B 28/06 |
| | | | 106/694 |
| 6,585,452 B1 * | 7/2003 | Hoeck, Jr. | C09K 17/16 |
| | | | 405/302.4 |
| 6,641,661 B1 * | 11/2003 | Jardine | C04B 24/2658 |
| | | | 106/724 |
| 7,321,006 B2 | 1/2008 | Hayashiya et al. | |
| 8,657,953 B2 * | 2/2014 | Farrington | C04B 24/10 |
| | | | 106/708 |
| 2004/0149172 A1 | 8/2004 | Jardine et al. | |
| 2007/0107638 A1 | 5/2007 | Chun et al. | |

FOREIGN PATENT DOCUMENTS

| | | | |
|---|---|---|---|
| GB | 1196952 | | 7/1970 |
| JP | 50-4126 A | * | 1/1975 |
| SU | 967992 A | * | 10/1982 |
| SU | 1724632 A | * | 7/1992 |
| WO | WO 88/01835 A1 | * | 3/1988 |
| WO | WO 2010/074811 A1 | | 7/2010 |

OTHER PUBLICATIONS

PCT application PCT/US2012/059253; filing date Oct. 8, 2012; Cement Innovations, LLC; International Search Report mailed Mar. 25, 2013.
Aberdeen Group; Fly ash, How much to use? What are the cost savings?; Publication #C850321; 1985; 2 pages; The Aberdeen Group.
Curtin; Molasses—General Considerations; Molasses in Animal Nutrition; 1983; 11 pages; National Feed Ingredients Association, West Des Moines, Iowa.
Jumadurdiyev et al.; The Utilization of beet molasses as a retarding and water-reducing admixture for concrete; Cement and Concrete Research; May 2005; pp. 874-882;p vol. 35, Issue 5; Elsevier.
Kavas et al.; Setting and hardening of borogypsum-Portland cement clinker-fly ash blends. Studies on effects of molasses on properties of mortar containing borogypsum; Cement and Concrete Research; Apr. 2006; pp. 711-718; vol. 35, Issue 4; Elsevier.
Mandal et al.; Modeling the compressive strength of molasses-cement sand system using design of experiements and back propagation neural network; Journal of Materials Processing Technology; Dec. 2006; pp. 167-173; Elsevier.
Turner; The Cement-sand-molasses process; Foundry Trade Journal; Jun. 10, 1976; pp. 831-840; vol. 140 (Best available copy—scan plus pdf conversions from jpeg of pp. 831,835,836,838,839).

(Continued)

*Primary Examiner* — Anthony J Green
(74) *Attorney, Agent, or Firm* — Thorpe North & Western, LLP

(57) ABSTRACT

Cement and concrete additives and related methods of making and using such additives are disclosed and described. An additive can include molasses and a carrier. An enhanced Portland cement composition can comprise about 97 wt % to 99.9 wt % of the composition and the above described additive comprises about 0.01 wt % to about 3 wt % of the composition.

8 Claims, 2 Drawing Sheets

(56) References Cited

OTHER PUBLICATIONS

Vilane; Assessment of stabilization of adobes by confined compression tests; Biosystems Engineering; Aug. 2010; pp. 551-558; vol. 106, Issue 4; Elsevier.

* cited by examiner

CEMENT ADDITIVES AND RELATED METHODS OF USE

RELATED APPLICATIONS

This application is a continuation application of U.S. application Ser. No. 14/350,337, filed Apr. 7, 2014, and now abandoned which is a national stage entry of PCT International Application No. PCT/US12/59253, filed Oct. 8, 2012, which claims the benefit of U.S. Provisional Patent Application Ser. No. 61/544,114, filed Oct. 6, 2011, and which are each incorporated by reference.

FIELD OF THE INVENTION

The present invention relates generally to cement and cement related products. More particularly, the present invention relates to strength enhancing cement additives.

BACKGROUND

Portland cement is a common building material and is used extensively across the world in a broad array of construction applications. Cement additives are known for use in enhancing various properties of cements such as their drying times, aeration, fluid loss regulators, temperature regulators, and strengtheners. The compositional nature of the additives is as wide-ranging as their intended uses. Typically, cement additives are aimed at addressing or enhancing one particular property of the cement, thus if multiple property enhancements are desired multiple additives are used. Accordingly, work continues in an effort to develop an additive that is effective in providing desirable enhancements to cements properties while being safe and cost effective.

SUMMARY OF THE INVENTION

An additive for Portland cements is provided. The additive includes a molasses and a carrier. The molasses and the carrier can be homogenously blended prior to admixing with the Portland cement. In another embodiment, a powdered Portland cement composition can be provided wherein the Portland cement comprises about 97 wt % to 99.6 wt % of the composition and the above described additive comprises about 0.01 wt % to about 3 wt % of the composition.

Additionally a method of manufacturing a Portland cement having enhanced compressive strength is provided. The method includes the step of admixing a Portland cement with an additive. The additive can comprise molasses and a carrier. The Portland cement and the additive are present in the enhanced Portland cement at a ratio of additive to Portland cement of 1:1000 (w/w) to 1:25 (w/w).

A method of manufacturing an additive for use in cements is disclosed. An amount of molasses can be admixed into a carrier composition to form a homogenous mixture. The homogenous mixture is heated to a temperature of about 50° C. to less than about 150° C. until the homogenous mixture is substantially dry. In some embodiments, the substantially dry additive mixture can be ground to form a fine powder.

A high fly ash-content concrete is further provided. The high fly ash-content concrete can include gravel, sand, Portland cement, fly ash and a molasses including additive. The ratio (w/w) of the amount of fly ash to the amount of Portland cement in the concrete can be about 3:7 to 4:1, and the concrete can have a compressive strength at 14 days that is at least 10% higher than the compressive strength at 14 days of an equivalent concrete with no additive.

Similarly, a method of providing increased early strength to high fly ash-content concrete is also provided. The method can include admixing gravel, sand, Portland cement, fly ash, water, and molasses to form a wet concrete mixture. The wet concrete mixture can be disposed in a desired location and allowed to cure to form a cured concrete. The ratio (w/w) of the amount of fly ash to the amount of Portland cement in the concrete can be about 3:7 to 4:1, and the concrete can have a compressive strength at 14 days that is at least 10% higher than the compressive strength at 14 days of an equivalent concrete with no additive.

A method of making concrete having increased compressive strength is also disclosed. The method includes admixing gravel, sand, cementicious material, water, and molasses to form a wet concrete mixture. The wet concrete mixture can then be disposed in a desired location and allowed to cure to form a cured concrete. The ratio (w/w) of the molasses to cementicious material in the concrete can be about 1:3000 to about 1:100, and the concrete can have a compressive strength at 14 days that is at least 20% higher than the compressive strength at 14 days of an equivalent concrete with no additive.

Finally, a method of reducing the amount of Portland cement required to make a concrete of a designated compressive strength is provided. The method provides for admixing gravel, sand, Portland cement, water, and molasses to form a wet concrete mixture having a target slump. The wet concrete mixture can be disposed in a desired location and allowed to cure to form a cured concrete. The amount of Portland Cement required to achieve the designated compressive strength is reduced by at least 20% compared to the amount of Portland cement required to make a concrete having the same target slump and designated compressive strength while having the same amount of sand and gravel and being free of molasses.

There has thus been outlined, rather broadly, the more important features of the invention so that the detailed description thereof that follows may be better understood, and so that the present contribution to the art may be better appreciated. Other features of the present invention will become clearer from the following detailed description of the invention, taken with the accompanying drawings and claims, or may be learned by the practice of the invention.

BRIEF DESCRIPTIONS OF DRAWINGS

Figure 1:
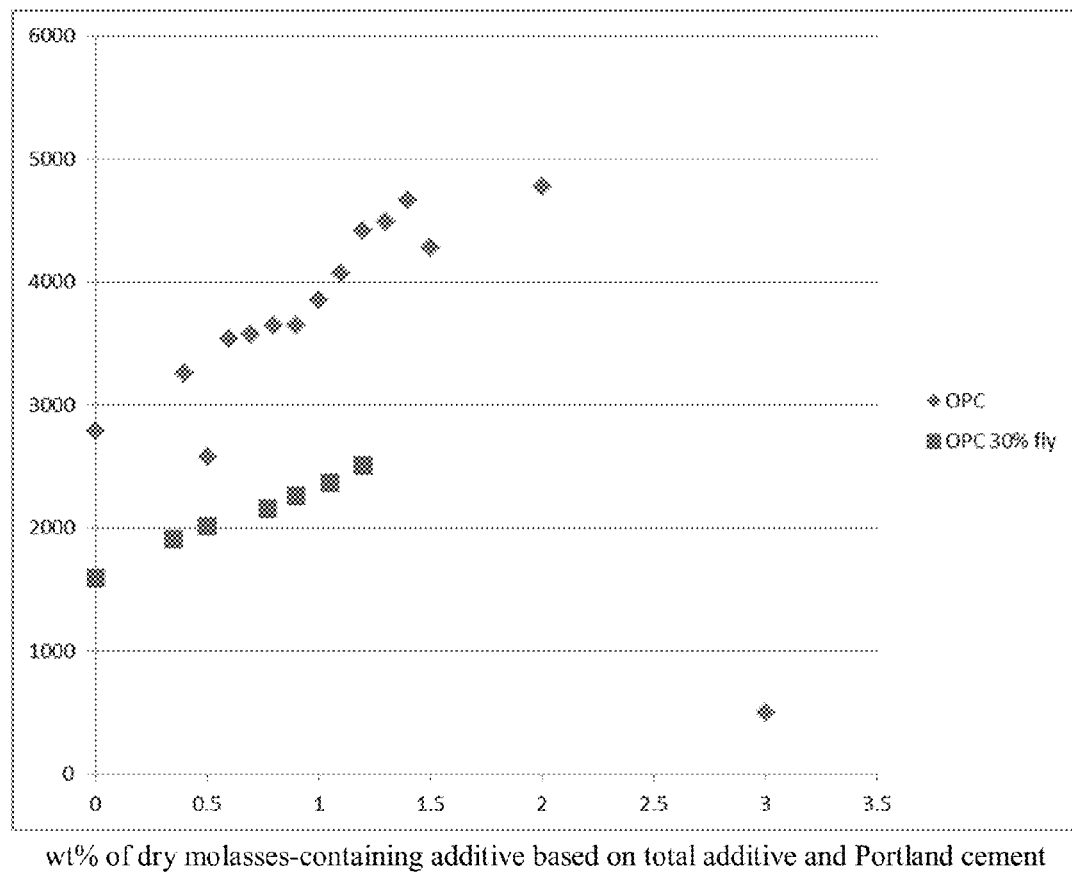
FIG. 1 is a plot of compressive strength (at 15 days) vs. concentrations of the additive of the claimed invention for concrete using only original Portland cement (OPC) and concrete with 30% of the original Portland cement replaced with fly ash.
Figure 2:
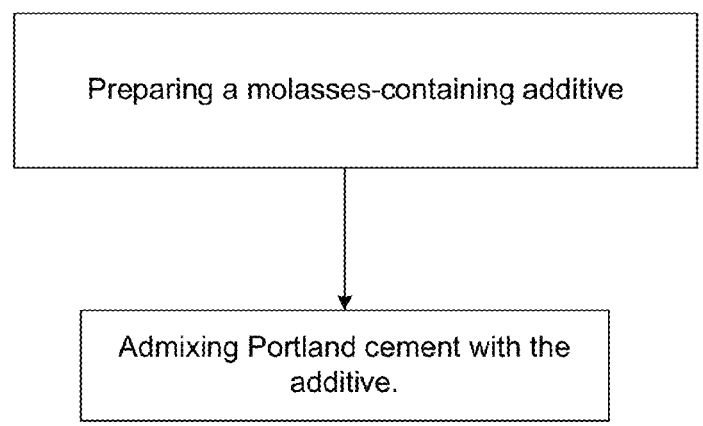
FIG. 2 is a flow diagram illustrating a method of one embodiment of the present invention.
Figure 3:
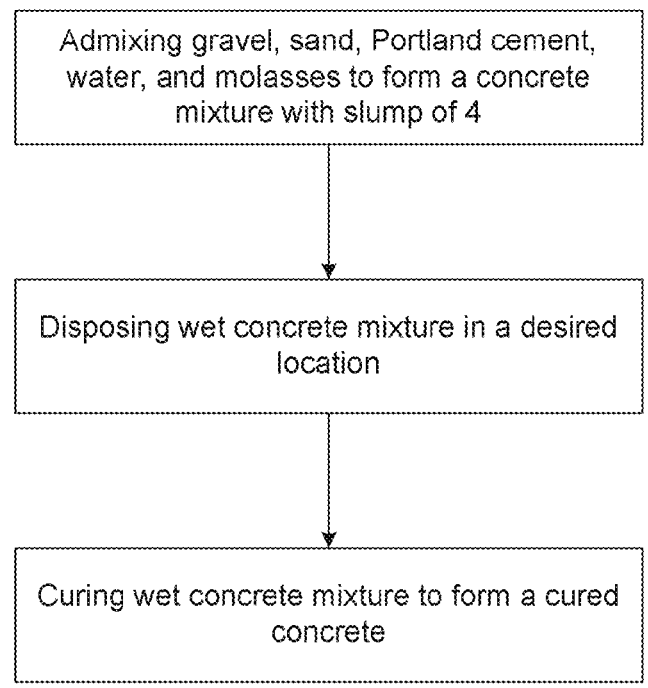
FIG. 3 is a flow diagram illustrating a method of one embodiment of the present invention.
Figure 4:
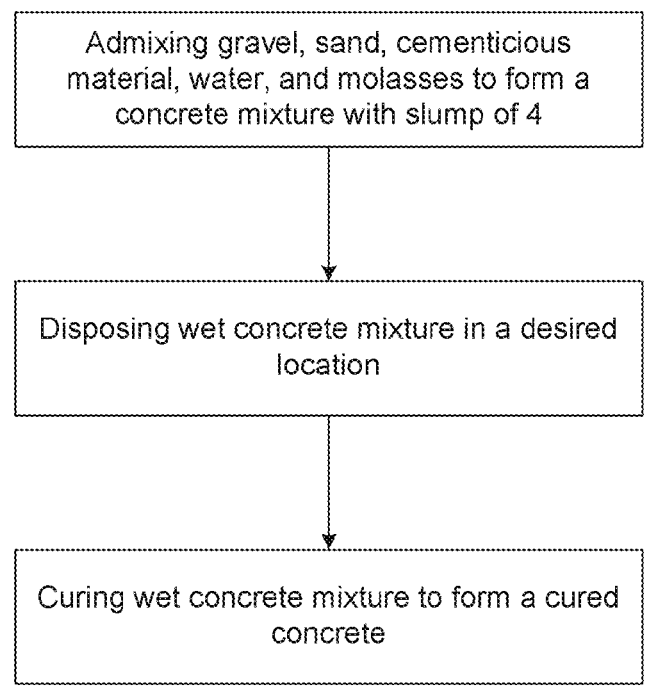
FIG. 4 is a flow diagram illustrating a method of one embodiment of the present invention.

These drawings are provided to illustrate various aspects of the invention and are not intended to be limiting of the scope in terms of dimensions, materials, configurations, arrangements or proportions unless otherwise limited by the claims.

DETAILED DESCRIPTION OF EXAMPLE EMBODIMENT(S)

While these exemplary embodiments are described in sufficient detail to enable those skilled in the art to practice the invention, it should be understood that other embodiments may be realized and that various changes to the invention may be made without departing from the spirit and scope of the present invention. Thus, the following more detailed description of the embodiments of the present invention is not intended to limit the scope of the invention, as claimed, but is presented for purposes of illustration only and not limitation to describe the features and characteristics of the present invention, to set forth the best mode of operation of the invention, and to sufficiently enable one skilled in the art to practice the invention. Accordingly, the scope of the present invention is to be defined solely by the appended claims.

Definitions

In describing and claiming the present invention, the following terminology will be used.

The singular forms "a," "an," and "the" include plural referents unless the context clearly dictates otherwise. Thus, for example, reference to "a carrier" includes reference to one or more of such compounds.

As used herein with respect to an identified property or circumstance, "substantially" refers to a degree of deviation that is sufficiently small so as to not measurably detract from the identified property or circumstance. The exact degree of deviation allowable may in some cases depend on the specific context. For example, when a composition is referred to as being substantially dry, the composition can be said to have a water content of less than about 5 wt %, less than about 2 wt %, or less than about 1 wt %.

Unless otherwise stated, the term "Portland cement" or "cement" refers to Portland cements defined by ASTM C 150.

The term "cementicious material" refers to compounds having cementing properties including, but not limited to ordinary Portland cement (OPC), fly ash, other pozzolans, and combinations thereof.

Except as otherwise stated, the term "equivalent concrete" refers to a concrete that is manufactured using the same amounts and types of sand, gravel, and Portland cement as an concrete including an additive of the present invention and which has the same slump as a concrete including an additive of the present invention. The amount of water need to achieve an equivalent concrete having the same slump as the compared concrete may be greater than a concrete having the additive as the additive can have the effect of reducing the amount of water necessary to achieve a target slump.

As used herein, "fly ash" can refer to fly ashes generally and can include any and all classes and types of fly ash such as Class F and Class C fly ash.

As used herein, "slump" refers to the measure of a fresh concrete's workability. The slump of a concrete measures the consistency of the concrete in that specific batch. It is also used to determine consistency between individual batches. Unless otherwise stated, the "slump" of any given concrete described herein refers to the measure of the slump as determined using the standard slump testing techniques (ASTM C143/C143M—10a). Typically, such measures of slump utilize inches as their unit of measure, although such units can be converted to other related units of measure such as centimeters (cm).

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a numerical range of about 1 to about 4.5 should be interpreted to include not only the explicitly recited limits of 1 to about 4.5, but also to include individual numerals such as 2, 3, 4, and sub-ranges such as 1 to 3, 2 to 4, etc. The same principle applies to ranges reciting only one numerical value, such as "less than about 4.5," which should be interpreted to include all of the above-recited values and ranges. Further, such an interpretation should apply regardless of the breadth of the range or the characteristic being described.

Any steps recited in any method or process claims may be executed in any order and are not limited to the order presented in the claims. Means-plus-function or step-plus-function limitations will only be employed where for a specific claim limitation all of the following conditions are present in that limitation: a) "means for" or "step for" is expressly recited; and b) a corresponding function is expressly recited. The structure, material or acts that support the means-plus function are expressly recited in the description herein. Accordingly, the scope of the invention should be determined solely by the appended claims and their legal equivalents, rather than by the descriptions and examples given herein.

With the above definitions in mind, the present invention is drawn to cement additives and related high strength cements and methods. In one embodiment, a additive for Portland cements is provided. The additive includes a molasses and a carrier. In one embodiment, the molasses and the carrier can be homogenously blended and dried to form a substantially dry powder.

The additives of the present invention can be formulated to be used with any known type of Portland cement including ordinary Portland cement and composite Portland cements. Non-limiting examples of Portland cements that can be used in combination with the additives of the present invention include ASTM cement types Type 1, Type II, Type III, Type IV, Type V, Type Ia, Type IIa, Type IIIa, TYPE II (MH), and TYPE II (MH). Similarly, EN-197 cement types I (Portland cement), II (Portland-composite cement), III (Blast furnace cement), IV (Pozzolanic cement), and V (Composite cement) can also be used with the additives of the present invention. The amount of additive necessary for a particular cement and its enhancement of the compressive strength of a given concrete utilizing a particular cement can vary depending on the type and amounts of cement used. However, generally speaking, the additive of the present invention can be effectively utilized to enhance the compressive strength of any type of concrete when used in conjunction with Portland cement.

The additives can be formulated for mixing with Portland cement and Portland cement compositions either in dry-mix form or during the wet preparation of concretes. In one embodiment, the additive can be formulated for mixing with Portland cement at a ratio of additive to Portland cement of about 1:1000 (w/w) to about 1:25 (w/w); about 0.4:250

(w/w) to 1:39 (w/w); about 0.4:100 (w/w) to about 1:40 (w/w); about 1:99 (w/w) to about 1:39 (w/w); or 1:124 (w/w) to about 1:49 (w/w). It is noteworthy that the same additive dosing ratios of additive to Portland cement can also be applied to the dosing of a concrete in which a portion of the Portland cement has been replaced with equivalent amounts of fly ash. In such cases, the ratio values reflect the amount of additive to the sum of the amounts of fly ash and Portland cement present in the composition. One of the benefits of the additives of the present invention is that they can dramatically increase the compressive strength of the concretes into which they are added. The additives disclosed herein can also provide additional benefits to concrete to which they are added. For example, in one embodiment the additive can act as a water reducer for the concrete (i.e. reduce the amount of water necessary to achieve a particular slump in a given concrete). In another embodiment, the additive can act as a plasticizer or plastifier. In yet another embodiment, the additive can act to make the concrete more workable and pumpable. In another embodiment, the additive can function to make a concrete to having elevated air content (e.g. 2-4% greater). In yet another embodiment, the additive can function as an accelerant, increasing the early compressive strength of the concrete to which it is added.

The additives of the present invention include molasses as a common component. The molasses can be derived or sourced from a variety of sources such as sugar cane, sugar beets, citrus, etc. Non-limiting examples of molasses that can be used include cane molasses, beet molasses, citrus molasses, hemicellulose extract molasses, starch molasses and combinations thereof. Typically cane sugar molasses includes at least 46% total sugars and has a Brix value of at least 79.5 Brix. Beet sugar molasses typically has at least 48 wt % total sugars and has a Brix value of at least 79.5 Brix. Citrus molasses is made from the partially dehydrated juices obtained from the manufacture of dried citrus pulp. Typically citrus molasses has a sugar content of at least 45% and a Brix value of at least 71 Brix. Hemicellulose extract molasses is a byproduct of the manufacture of pressed wood and is the concentrated soluble material obtained from the treatment of wood at elevated temperatures without the use of acids, alkalis, or salts. Typically the hemicellulose molasses has a total carbohydrate content of not less than 55% and can have a Brix value of not less than about 65 Brix. Starch molasses is a byproduct of dextrose manufacture from corn and grain sorghums where the starch is hydrolyzed by enzymes and/or acid. The starch molasses typically has 43% reducing sugars content, expressed as dextrose, and not less than 50% total sugars expressed as dextrose. The Brix value for the starch molasses is typically at least about 78 Brix.

Without being limited by theory, it is believed that the Brix value of the molasses used can have an impact on the potency of the additive. Accordingly, in some embodiments it can be desirable to use a molasses having a higher Brix value. For example, in one embodiment, the Brix value can be at least about 65 Brix. In another embodiment, the Brix value of the Molasses can be at least about 71 Brix. In yet another embodiment, the Brix value of the molasses used can be at least about 78 Brix. In still further embodiments, the Brix value of the molasses used can be at least about 79.5 Brix or at least about 84 Brix. Generally, the upper end of the Brix value is only limited by the ability of the manufacture of the molasses to manufacture a particular a molasses having a particular Brix concentration. The molasses used can also be dehydrated or dried using any known method in the art.

The additive of the present invention can be molasses alone or it can include molasses in combination with other ingredients, e.g. a carrier. When used alone or in diluted form, the molasses can be in a liquid or solid state. When solid it can be preferable to grind the molasses into a powder or small particle form so that it can be more readily and homogenously dispersed throughout the concrete. In one embodiment, the powder can have an average particle size of less than about 150 microns. In another embodiment, the powder can have an average particle size of less than about 100 microns. As the molasses can alone be utilized as the additive of the present invention, the molasses can comprise up to 100 wt % of the total additive. In some embodiments, the molasses can be combined with other ingredients, referred to herein as carriers, to form a liquid or dry additive. When combined with a liquid carrier the molasses can be dissolved, diluted, or dispersed in the carrier prior to addition of the carrier to Portland cement. Various types of liquid carriers can be employed including water or other liquid carriers (e.g. organic solvents) that are compatible with Portland cement or in the preparation of concrete. When the carrier is a liquid carrier, such as water, the ratio (w/w) of the amount of the carrier to the amount of molasses can be about 1:99 to about 99:0.01. As the primary purpose of the liquid carrier is to aid in the application or admixing of the molasses with the Portland cement, the amount can be varied depending on the point in time at which the molasses is combined with the Portland cement.

When combined with carriers, the molasses can comprise from 0.5 wt % to about 99.5 wt % of the total additive. In one embodiment, the molasses can comprise about 1 wt % to about 99 wt % of the additive. In another embodiment, the molasses can comprise about 10 wt % to about 80 wt % of the additive. In another embodiment, the molasses can comprise about 15 wt % to about 60 wt % of the additive. In still further embodiments, the molasses can comprise about 15 wt % to about 40 wt % of the additive, about 20 wt % to about 38 wt % of the additive, about 25 wt % to about 35 wt % of the additive, or about 28 wt % to about 33 wt % of the additive.

It is noteworthy that when the compositional make-up of the additive is described by the weight percent (wt %) of a component in the additive, this value is based on the wet weight of the additive and not its dry weight. As can be appreciated by those skilled in the art, the weight percent values of the formulation would be altered when the additive is dried. With this in mind, the amounts of components present in a formulation can also be described in terms of ratio (w/w) of the components, e.g. molasses to carrier. In one aspect of the invention, and depending on the carrier used, the additive can have a molasses to carrier ratio that is about 1:5 (w/w) to about 100:1 (w/w); about 1:4 (w/w) to about 50:1 (w/w); or about 1:4 (w/w) to about 4:1 (w/w). In another aspect, the additive can have a molasses to carrier ratio that is about 1:3 (w/w) to about 2:3 (w/w). It yet a further aspect, the additive can have a molasses to carrier ratio that is about 1:3 (w/w) to about 7:13 (w/w).

When the additive includes a carrier, the carrier material can include one or more components. Generally speaking the components should be material that is compatible with Portland cement and that does not interfere with the cements ability to function properly. When present, the carrier can comprise from 0.5 wt % to about 99.5 wt % of the additive. In another embodiment, the carrier can comprise about 1 wt % to about 99 wt % of the additive. In one embodiment, the carrier can comprise about 60 wt % to about 90 wt % of the additive. In another embodiment, the carrier can comprise about 65 wt % to about 85 wt % or 65 wt % to about 80 wt % of the additive. In still another embodiment, the carrier can comprise about 65 wt % to about 75 wt % of the additive.

In one embodiment, the carrier can be a dry or substantially dry material. In one embodiment, the substantially dry carrier material can be in a milled or ground having particle sizes that are similar to the particle sizes of powdered Portland cement materials, e.g. less than about 150 microns. In another embodiment, the carrier material can be a liquid carrier such as water or other solvent that would be compatible with molasses and with the concrete. When the carrier includes a powder material, the powder can be inert or can have some cementicious properties. Non-limiting examples of materials that can be used as carriers include fly ash, metakaolin, shale, slate, limestone, basalt, rhyolite, bottom ash, pozzolanic ash (e.g. volcanic ash), blast furnace slag, microsilica (silica fume), ash, and combinations thereof. In one embodiment, the carrier can include powdered or pulverized volcanic rock material. In another embodiment the carrier can include a powdered combustion product such as fly ash.

In one embodiment, the carrier material can include fly ash. In one embodiment, the fly ash can comprise about 60 wt % to about 80 wt % of the additive. In another embodiment, the fly ash can comprise about 65 wt % to about 75 wt % of the additive. In another embodiment, the fly ash can comprise about 68 wt % of the additive. The additive may also include microsilica as a carrier. Although the percentage of the microsilica in the additive may be higher, in one embodiment, the microsilica can comprise about 0.5 wt % to about 4 wt % of the additive. In yet another embodiment, the microsilica can comprise about 1 wt % to about 3 wt % of the additive. In yet another embodiment, the carrier can include both fly ash and microsilica, and the additive can comprise microsilica, fly ash, and molasses. In another embodiment, the additive can consist essentially of microsilica, fly ash and molasses.

In one embodiment, the additive can comprise about 10 wt % to 80 wt % fly ash, 0.1 wt % to about 5 wt % microsilica, and about 15 wt % to about 50 wt % molasses. In another embodiment, the additive can comprise about 50 wt % to 75 wt % fly ash, 1 wt % to about 3 wt % microsilica, and about 20 wt % to about 40 wt % molasses. In yet another embodiment, the additive includes fly ash, microsilica, and molasses the fly ash can make up about 65 wt % to about 75 wt % of the additive, the microsilica can make up about 1.5 wt % to about 2.5 wt % of the additive, and the molasses can make up about 25 wt % to about 35 wt % of the additive. In one aspect of the invention, the additive can have a ratio of molasses to the sum of amounts of fly ash and microsilica of about 1:5 (w/w) to about 100:1 (w/w); about 1:4 (w/w) to about 50:1 (w/w); or about 1:4 (w/w) to about 4:1 (w/w). In another aspect, the additive can have a ratio of molasses to the sum of the fly ash and microsilica of about 1:3 (w/w) to about 2:3 (w/w) or about 1:3 (w/w) to about 7:13 (w/w).

In addition to the molasses and carrier components described above, the additives of the present invention can also include other classes and types of concrete enhancement compositions or compounds that are known in the art. The additive can be formulated to include these compounds or the additive can be formulated for use in combination with such compounds. Non-limiting examples of such types of compositions include accelerators, aerators, plasticizers, water reducers, colorants, fluidizers, combinations thereof, and the like. Non-limiting examples of specific compounds include polycarboxylate ether, sodium lignosulfate, sodium naphthalene sulfonate, melamine sulfonate, and combinations thereof.

In one embodiment a dried molasses-containing additive can be made. Molasses can be difficult to work with and can be particularly challenging to reduce to a powdered form due to the various components in the molasses and the propensity of the molasses to carbonize when heated, either too quickly or at excessive temperatures. Applicants have discovered a technique that can be used in the manufacture of a powdered molasses additive. With this in mind, a method of manufacturing an additive for use with Portland cements is provided. The method includes admixing an amount of molasses into a carrier composition to form a homogenous mixture. The homogenous mixture can then be heated to a temperature of about 50° C. to less than about 150° C. until the homogenous mixture is substantially dry. During this warming step, and any other heating of the molasses, it can be useful to gently warm the molasses in order to avoid carbonizing all or portions of the molasses. In one embodiment, the homogenous mixture can be continuously or intermittently mixed and or broken up, either manually or automatically, during the drying process. In one embodiment, the drying of the additive can occur at a temperature of about 75° C. to about 110° C. The temperature at which the additive is dried can have an effect on the ability of the additive to increase the compressive strength of a concrete. While increases in compressive strength can be observed at a range of drying temperatures, maximum strength can be attained by drying the additive at particular temperatures. When the additive is dried at excessively high temperatures its potency can be diminished.

The drying of the molasses may also be achieved by placing the vacuum dehydration of the additive. A vacuum may also be employed in combination with the heating described above. Regardless of the drying technique used, in one embodiment, the substantially dry powder additive can have a water content of less than about 5 wt % based on the additive as a whole. In another embodiment, the substantially dry additive can have a water content of less than about 2 wt % based on the additive as a whole. In yet another embodiment, the substantially dry additive can have a water content of less than about 1 wt % based on the additive as a whole. In some embodiments, the substantially dry additive mixture can be ground to form a powder. The grinding can be achieved through any method known in the art including manual and automated grinding techniques. In one aspect of the invention, the milling or grinding can occur at a temperature of about 37° C. to about 110° C. In one embodiment, the ground powder can have an average particle size of about 150 microns or less. In another embodiment, the average particle size of the ground additive can have an average particle size of about 100 microns or less.

An enhanced Portland cement composition is also provided. The enhanced Portland cement composition can comprises about 97 wt % to 99.9 wt % of the composition and the additive of the present invention can comprises about 0.01 wt % to about 3 wt % of the composition. These strength enhanced Portland cement compositions can be used immediately or can be packaged, stored, or shipped for use at a later date. The enhanced Portland cement composition can be formulated such that upon mixing with an amount of water, gravel, and sand to form a concrete having a target slump (e.g. 4 inches), and then allowing the concrete to cure for 28 days, the concrete has a compressive strength after 28 days that is at least 30% greater than the compressive strength after 28 days of an equivalent concrete with no additive. In additional embodiments, the enhanced Portland cement can be formulated such that when made and tested as described above, the concrete has a compressive strength after 28 days that is at least 40%, 50%, 60%, or 70% greater than an equivalent concrete with no additive.

A method of manufacturing such an enhanced Portland cement composition is also provided is provided. The enhanced Portland cement can give a concrete in which it is utilized enhanced compressive strength as compared to equivalent concretes without the enhanced Portland cement. The method includes the step of admixing a Portland cement with an additive containing molasses. The additive can comprises a molasses and a carrier. The Portland cement and the additive are present in the enhanced Portland cement at a ratio of additive to Portland cement of 1:1000 (w/w) to 1:25 (w/w). In one embodiment, the ratio (w/w) of molasses (i.e. just the molasses component of the additive, based on initial manufacturing weights for the additive) to Portland cement in the enhanced Portland cement product can be about 1:10000 to about 1:50. In a particular embodiment, the ratio (w/w) can be about 1:3000 to about 1:100. In a further embodiment, the molasses comprises less than about 1 wt % of the enhanced Portland cement.

As discussed above, in some embodiments the carrier can be a liquid carrier such as water. When the carrier is a liquid carrier the admixing of the additive (carrier and molasses) can occur during the manufacturing process of the Portland cement. As is well known in the art, Portland cement is formed through intense heating of rocks having specified mineral contents. After heating a product known as clinker is formed and subsequently cooled prior to grinding of the clinker into Portland Cement powder.

In some embodiments, when the carrier is a liquid the step of admixing can occur following the formation of the clinker, such as during or after the cooling down of the clinker material. In such embodiments, the admixing of the additive can be accomplished by spraying the additive onto the clinker material that is at an elevated temperature. The level of the elevated temperature can affect the effectiveness of the enhanced Portland cement. Specifically, if the temperature is too high all or portions of the components of the molasses can be burned or altered thereby destroying all or part of the effectiveness of the additive. With this in mind, the elevated temperature can be higher than room temperature (i.e. 25° C.) and in some embodiments it can be as high as 500° F. In one embodiment, the elevated temperature is less than 450° F. In another embodiment, the elevated temperature can be less than about 350° F. In another embodiment, the elevated temperature is less than about 300° F. In a further embodiment, the elevated temperature can be about 275° F. In still a further embodiment, the elevated temperature can be less than about 275° F. In a particular embodiment, the temperature can be less than about 230° F.

In addition to admixing of the additive with the clinker during its cooling, the additive can also be admixed during the grinding of the clinker into Portland cement powder. The grinding process can release significant heat which in turn can be useful in driving off all or portions of the liquid carrier component of the additive.

A method of making concrete having increased compressive strength is also disclosed. The method includes admixing gravel, sand, cementicious material, water, and molasses to form a wet concrete mixture. The wet concrete mixture can then be disposed in a desired location and allowed to cure to form a cured concrete. The ratio (w/w) of the molasses to cementicious material in the concrete can be about 1:3000 to about 1:100, and the concrete can have a compressive strength at 14 days that is at least 20% higher than the compressive strength at 14 days of an equivalent concrete with no additive. In one embodiment, the ratio (w/w) of the molasses to cementicious material in the concrete can be about 1:1000 to about 1:50. In most embodiments, the cementicious material includes Portland cement. The concrete with enhanced compressive strength can be formed into virtually any type of structure that can be made using concrete. In one embodiment, the concrete can be formed into a structure selected from a concrete block, a concrete beam, a concrete pillar, a concrete footing, a concrete slab, a concrete tank, a concrete floor, and a concrete wall.

A method of reducing the amount of Portland cement required to make a concrete of a designated compressive strength is also provided. The method provides for admixing gravel, sand, Portland cement, water, and molasses to form a wet concrete mixture having a target slump. The wet concrete mixture can be disposed in a desired location and allowed to cure to form a cured concrete. The amount of Portland Cement required to achieve the designated compressive strength is reduced by at least 20% compared to the amount of Portland cement required to make a concrete having the same target slump and designated compressive strength while having the same amount of sand and gravel and being free of molasses.

In additional embodiments, the amount of Portland cement required to achieve the designated compressive strength can be reduced by at least about 30%, at least about 40%, at least about 50%, or at least about 60% compared to the amount of Portland cement required to make an equivalent concrete having the same target slump and designated compressive strength while having the same amount of sand and gravel, and being free of molasses. In one embodiment, the concrete made with reduced amounts of Portland cement can include a filler material. The filler material can be present to replace the volume in the concrete that was lost to the removal of the Portland cement and can be replace all or just a portion of the Portland cement that was reduced and removed under the method. The filler material used in the concrete can be any material that is compatible with concrete. In one embodiment, the filler material can be an inert material. Non-limiting examples of filler materials include fly ash, metakaolin, microsilica, shale, slate, limestone, basalt, rhyolite, ground ash, diatomaceous earth, sand, and combinations thereof. In one embodiment, the filler material can be fly ash, slate, limestone, basalt, and combinations thereof.

Although fly ash is known and used in many concrete compositions, there is typically a limit on the amount of fly ash that can be used due to the impact on the compressive strength of the concrete, particularly, the short term compressive strength. With this in mind, the present invention further provides for a high fly ash-content concrete. The high fly ash-content concrete can include gravel, sand, Portland cement, fly ash and a molasses-including additive, such as described herein. The ratio (w/w) of the amount of fly ash to the amount of Portland cement in the concrete can be about 3:7 to 4:1, and the concrete can have a compressive strength at 14 days that is at least 10% higher than the compressive strength at 14 days of an equivalent concrete with no additive. In one embodiment, the high fly ash-content concrete can have at least about 20%, 30%, 40%, 50%, 60%, or at least 70% higher compressive strength at 14 days than an equivalent concrete with no additive. In one embodiment, the high fly ash content concrete can have a ratio (w/w) of fly ash to the amount of Portland cement of about 2:3 to about 3:1. FIG. 1 shows a plot of compressive strength vs. concentrations of the additive of the claimed invention for concrete having only original Portland cement (OPC) and concrete with 30% of the original Portland cement replaced with fly ash. The first data points from each of the two curves is a point containing no (0%) of the additive. As can be observed from the two curves, the compressive strength of both concretes (OPC only and OPC with 30% fly ash) increases fairly linearly from 0 wt % additive (based on cement and fly ash content of concrete) to about 1.5 wt % to 2 wt %. Without being limited by theory, it is believed that the linear increase of compressive strength increases starts to slow at somewhere between 1.5 wt % at 2.5 wt %, although ideal dosing amounts will vary depending on the nature of the gravel, sand and other components present in the concrete.

The increase in early compressive strength in high fly ash concretes is particularly beneficial in that it allows for the use of high fly-ash content concrete in construction without the need to wait extended periods of time following the pour of the concrete before additional construction can continue. The high fly ash-content concrete can be formed into any structure known in the art to be formed from concrete. For example, non-limiting examples of such structures can include concrete blocks, concrete beams, concrete pillars, concrete footings, concrete slabs, concrete floors, concrete walls, and the like.

Similarly, a method of providing increased early strength to high fly ash-content concrete is also provided. The method can include admixing gravel, sand, Portland cement, fly ash, water, and molasses to form a wet concrete mixture. The wet concrete mixture can be disposed in a desired location and allowed to cure to form a cured concrete. The ratio (w/w) of the amount of fly ash to the amount of Portland cement in the concrete can be about 3:7 to 4:1, and the concrete can have a compressive strength at 14 days that is at least 10% higher than the compressive strength at 14 days of an equivalent concrete with no additive. In one embodiment, the high fly ash-content concrete can have at least about 20%, 30%, 40%, 50%, 60%, or at least 70% higher compressive strength at 14 days than an equivalent concrete with no additive. In one embodiment, the ratio of the amounts of fly ash to the amount of Portland cement in the concrete can be about 2:3 (w/w) to about 3:1 (w/w).

The foregoing detailed description describes the invention with reference to specific exemplary embodiments. However, it will be appreciated that various modifications and changes can be made without departing from the scope of the present invention as set forth in the appended claims. The detailed description and the following example are to be regarded as merely illustrative, rather than as restrictive, and all such modifications or changes, if any, are intended to fall within the scope of the present invention as described and set forth herein.

EXAMPLES

Example 1

Dry Molasses-Containing Additive for Use with Portland Cement

A dry molasses-containing additive according to one embodiment of the present invention was manufactured as described below. A carrier composition of fly ash and microsilica (silica fume) was prepared by thoroughly blending 68 grams of fly ash and 2 grams of microsilica. 30 grams of 84 Brix cane sugar molasses is admixed into the homogenous carrier composition and blended thoroughly to yield a substantially homogenous dough. The dough is spread evenly in a container and heated in a drying oven at a temperature of about 60° C. to about 150° C. until the dough is substantially dry. To facilitate accelerated drying the dough can be regularly stirred and/or broken up in order to increase surface area and exposure. Once the substantially dry additive is formed, it can be stored in dry moisture resistant containers so as to maintain the additive dryness. If desired, the substantially dry additive can be crushed or ground in order to form a powder having small particle sizes (e.g. <150 microns).

Examples 2 and 3

Enhanced Compressive Strength Concretes

Enhanced compressive strength concretes and related control concretes (without additive) were made using the components as outlined in Tables 1 and 2. The additive used in Examples 2 and 3 is compositionally similar to the additive manufactured in Example 1.

TABLE 1

|  | Water (kg) | Portland Cement* (kg) | Gravel (kg) | Sand (kg) | Slump (cm) | Additive (kg) | Duration (days) | Compressive Strength (kg/cm$^2$) | % Increase of Compressive Strength** |
|---|---|---|---|---|---|---|---|---|---|
| Control | 200 | 300 | 900 | 802 | 10 | — | 7 | 142 | — |
| Example 2 | 190 | 297.6 | 970 | 765 | 12 | 2.4 | 7 | 203.9 | 43.6% |

*Portland Cement is Cruz Azul CPC 40

**The percent increase (%) is relative to the control

TABLE 2

| | Water (kg) | Portland Cement* (kg) | Gravel (kg) | Sand (kg) | Slump (cm) | Additive (kg) | Duration (days) | Compressive Strength (kg/cm$^2$) | % Increase of Compressive Strength** |
|---|---|---|---|---|---|---|---|---|---|
| Control | 200 | 300 | 900 | 802 | 12 | — | 14 | 170 | — |
| Example 3 | 186 | 297.6 | 900 | 802 | 12 | 2.4 | 14 | 251.6 | 48% |

*Portland Cement is Cruz Azul CPC 40
**The percent increase (%) is relative to the control The example and control concretes were made using standard concrete manufacturing techniques. The cement, sand and gravel were placed in a standard cement mixer, the mixer was turned on, and the water was slowly added while the mixer was turning. For the example concretes, the additive was added to the concrete while the concrete was mixing in the cement mixer and the concrete and the additive were allowed to mix thoroughly to yield the concrete. The slump of each of the control and example concretes was tested using industry standard slump testing techniques (ASTM C143/C143M—10a). Once the concrete was desired slump was determined and attained, the concrete (both example and control) was filled into compression test cylinders according to industry standard techniques (ASTM 0873/0873M—10a).

The filled cylinders were allowed to cure for periods of 7 (Example 2) and 14 days (Example 3) and the compressive strength of each of the cylinders was tested using a compressive strength cylinder testing device. The compressive strengths of the cylinders are shown in Tables 1 and 2. As can be seen from the table, the additive-containing Examples 2 and 3 had compressive strengths that are about 43% and 48% greater, respectively, than their respective control concretes (no additive).

Examples 4-7

Enhanced Compressive Strength Concrete

Enhanced compressive strength concretes and related control concrete (without additive) were made using the components as outlined in Table 3. The additive used in Examples 4-7 is compositionally similar to the additive manufactured in Example 1.

The example and control concretes were made using standard concrete manufacturing techniques. The cement, sand and gravel were placed in a standard cement mixer, the mixer was turned on, and the water was slowly added while the mixer was turning. For the example concretes, the additive was added to the concrete while the concrete was mixing in the cement mixer and the concrete and the additive were allowed to mix thoroughly to yield the concrete. The slump of each of the control and example concretes was tested using industry standard slump testing techniques (ASTM C143/C143M—10a). Once the concrete was desired slump was determined and attained, the concrete (both example and control) was filled into compression test cylinders according to industry standard techniques (ASTM 0873/0873M—10a).

The filled cylinders were allowed to cure for periods of 7 days and the compressive strength of each of the cylinders was tested using a compressive strength cylinder-testing device. The compressive strengths of the cylinders are shown in Table 3. As can be seen from the table, the additive-containing Examples 4-7 had compressive strengths that are from about 44% to 55% greater than the control concrete (no additive). It is further noted that Examples 4-7 demonstrate that the use of the additive allows for reduction of water while still forming a concrete having the same slump as the control concrete (comparing Example 6 to the control concrete).

Examples 8-11

Enhanced Compressive Strength Concrete

Enhanced compressive strength concretes and related control concrete (without additive) was made using the components as outlined in Table 4. The additive used in Examples 8-11 is compositionally similar to the additive manufactured in Example 1.

TABLE 3

| | Water (kg) | Portland Cement* (kg) | Gravel (kg) | Sand (kg) | Slump (cm) | Additive (kg) | Duration (days) | Compressive Strength (kg/cm$^2$) | % Increase of Compressive Strength** |
|---|---|---|---|---|---|---|---|---|---|
| Control | 200 | 300 | 910 | 800 | 12 | — | 7 | 134 | — |
| Example 4 | 188 | 297 | 930 | 810 | 16 | 3 | 7 | 192.9 | 43.9% |
| Example 5 | 184 | 297 | 940 | 815 | 14 | 3 | 7 | 196.6 | 46.7% |
| Example 6 | 180 | 297 | 950 | 820 | 12 | 3 | 7 | 199.8 | 48.5% |
| Example 7 | 176 | 297 | 950 | 820 | 10 | 3 | 7 | 208.2 | 55.3% |

*Portland Cement is Cruz Azul CPC 40
**The percent increase (%) is relative to the control

TABLE 4

|  | Water (kg) | Portland Cement* (kg) | Gravel (kg) | Sand (kg) | Slump (cm) | Additive (kg) | Duration (days) | Compressive Strength (kg/cm$^2$) | % Increase of Compressive Strength** |
|---|---|---|---|---|---|---|---|---|---|
| Control | 200 | 250 | 950 | 800 | 12 | — | 28 | 153 | — |
| Example 8 | 190 | 247.5 | 950 | 800 | 15 | 2.5 | 28 | 224.9 | 49% |
| Example 9 | 186 | 247.5 | 960 | 80 | 16 | 2.5 | 28 | 232.5 | 52% |
| Example 10 | 186 | 247 | 960 | 800 | 16 | 3.0 | 28 | 235.2 | 53.7% |
| Example 11 | 186 | 246.5 | 960 | 800 | 16 | 3.5 | 28 | 220.6 | 44.1% |

*Portland Cement is Cruz Azul CPC 40
**The percent increase (%) is relative to the control The example and control concretes were made using standard concrete manufacturing techniques. The cement, sand and gravel were placed in a standard cement mixer, the mixer was turned on, and the water was slowly added while the mixer was turning. For the example concretes, the additive was added to the concrete while the concrete was mixing in the cement mixer and the concrete and the additive were allowed to mix thoroughly to yield the concrete. The slump of each of the control and example concretes was tested using industry standard slump testing techniques (ASTM C143/C143M—10a). Once the concrete was desired slump was determined and attained, the concrete (both example and control) was filled into compression test cylinders according to industry standard techniques (ASTM 0873/0873M—10a).

The filled cylinders were allowed to cure for periods of 28 days and the compressive strength of each of the cylinders was tested using a compressive strength cylinder-testing device. The compressive strengths of the cylinders are shown in Table 4. As can be seen from the table, the additive-containing Examples 8-11 had compressive strengths that are about 44% to 53% greater than their respective control concrete (no additive).

Examples 12-13

Enhanced Compressive Strength Concrete

Enhanced compressive strength concretes and related control concretes (without additive) were made using the components as outlined in Tables 5 and 6. The additive used in Examples 12-13 is compositionally similar to the additive manufactured in Example 1.

The example and control concretes were made using standard concrete manufacturing techniques. The cement, sand and gravel were placed in a standard cement mixer, the mixer was turned on, and the water was slowly added while the mixer was turning. For the example concretes, the additive was added to the concrete while the concrete was mixing in the cement mixer and the concrete and the additive were allowed to mix thoroughly to yield the concrete. The slump of each of the control and example concretes was tested using industry standard slump testing techniques (ASTM C143/C143M—10a). Once the concrete's desired slump was determined and attained, the concrete (both example and control) was filled into compression test cylinders according to industry standard techniques (ASTM 0873/0873M—10a).

The filled cylinders were allowed to cure for periods of 3 (Example 12) and 7 days (Example 13) and the compressive strength of each of the cylinders was tested using a compressive strength cylinder testing device. The compressive strengths of the cylinders are shown in Tables 5 and 6. As can be seen from the table, the additive-containing Examples 12 and 13 had compressive strengths that are about 31.5% and 51.9% greater, respectively, than their respective control concretes (no additive). It is noteworthy that even at the extreme early cure period of 3 days the additive of the present invention already provides significant compressive strength increases.

TABLE 5

|  | Water (kg) | Portland Cement* (kg) | Gravel (kg) | Sand (kg) | Slump (cm) | Additive (kg) | Duration (days) | Relative Compressive strength | % Increase of Compressive Strength** |
|---|---|---|---|---|---|---|---|---|---|
| Control | 200 | 300 | 950 | 770 | 12 | — | 3 | 48.12% | — |
| Example 12 | 184 | 298.2 | 950 | 770 | 12 | 1.8 | 3 | 63.27% | 31.5% |

*Portland Cement is Cruz Azul CPC 40
**The percent increase (%) is relative to the control

TABLE 6

|  | Water (kg) | Portland Cement* (kg) | Gravel (kg) | Sand (kg) | Slump (cm) | Additive (kg) | Duration (days) | Relative Compressive strength | % Increase of Compressive Strength** |
|---|---|---|---|---|---|---|---|---|---|
| Control | 200 | 300 | 950 | 770 | 12 | — | 7 | 68.2% | — |
| Example 13 | 184 | 298.2 | 950 | 770 | 12 | 1.8 | 7 | 103.6% | 51.9% |

*Portland Cement is Cruz Azul CPC 40
**The percent increase (%) is relative to the control

Examples 14-16

Concrete with Reduced Portland Cement Replaced with Fly Ash

Enhanced compressive strength concretes and related control concretes (without additive) were made using the components as outlined in Tables 7 and 8. The example concretes were made by replacing an amount of the Portland cement used in the control with an amount of additive and fly ash. The additive used in Examples 14-16 is compositionally similar to the additive manufactured in Example 1.

The example and control concretes were made using standard concrete manufacturing techniques. The cement, sand, gravel (and fly ash for Examples 14-16) were placed in a standard cement mixer, the mixer was turned on, and the water was slowly added while the mixer was turning. For the example concretes, the additive was added to the concrete while the concrete was mixing in the cement mixer and the concrete and the additive were allowed to mix thoroughly to yield the concrete. The slump of each of the control and example concretes was tested using industry standard slump testing techniques (ASTM C143/C143M—10a). Once the concrete's desired slump was determined and attained, the concrete (both example and control) was filled into compression test cylinders according to industry standard techniques (ASTM C873/C873M—10a).

The filled cylinders were allowed to cure for periods of 9 (Example 14) and 14 days (Example 15-16) and the compressive strength of each of the cylinders was tested using a compressive strength cylinder testing device. The compressive strengths of the cylinders are shown in Tables 7 and 8. As can be seen from the table, the additive-containing Examples 14-16 had similar compressive strengths to the related control concretes, although there was a diminishing in compressive strength after the fly ash concentration increased beyond a certain point.

TABLE 7

| | Water (kg) | Portland Cement* (kg) | Thermoelectric Plant Fly Ash (kg) | Gravel (kg) | Sand (kg) | Slump (cm) | Additive (kg) | Duration (days) | Compressive Strength (kg/cm$^2$) | % Increase of Compressive Strength** |
|---|---|---|---|---|---|---|---|---|---|---|
| Control | 200 | 300 | — | 960 | 800 | 12 | — | 9 | 152.88 | — |
| Example 14 | 180 | 238.56 | 59.64 | 960 | 800 | 12 | 1.8 | 9 | 164.21 | 7.4% |

*Portland Cement is Cruz Azul CPC 40
**The percent increase (%) is relative to the control

TABLE 8

| | Water (kg) | Portland Cement* (kg) | Thermoelectric Plant Fly Ash (kg) | Gravel (kg) | Sand (kg) | Slump (cm) | Additive (kg) | Duration (days) | Compressive Strength (kg/cm$^2$) | % Increase of Compressive Strength** |
|---|---|---|---|---|---|---|---|---|---|---|
| Control | 190 | 300 | — | 960 | 800 | 11 | — | 14 | 174 | — |
| Example 15 | 171 | 225 | 72.3 | 990 | 800 | 11 | 2.7 | 14 | 175.6 | 0.9% |
| Example 16 | 171 | 210 | 87.3 | 990 | 800 | 11 | 2.7 | 14 | 160.8 | −7.5% |

*Portland Cement is Cruz Azul CPC 40
**The percent increase (%) is relative to the control

Examples 17-28

Concrete with Reduced Portland Cement Replaced with Filler Material

Examples 17-28 were prepared in a manner similar to Examples 15-16 except that instead of substituting Portland cement with Fly ash, the Portland cement was substituted with ground limestone (Examples 17-19), ground slate (Examples 20-22), ground basalt (Examples 23-25), or ground pozzolanic fly ash (Examples 26-28). Related controls for each of the varying formulations were also prepared and tested. The compositional formulations for each of the controls and examples are set forth in Tables 9-12.

TABLE 9

| | Water (kg) | Portland Cement* (kg) | Ground Limestone (kg) | Gravel (kg) | Sand (kg) | Slump (cm) | Additive (kg) | Duration (days) | % of Target Compressive strength | % Increase of Compressive Strength** |
|---|---|---|---|---|---|---|---|---|---|---|
| Control | 180 | 300 | — | 930 | 800 | 9 | — | 10 | 82.2% | — |
| Example 17 | 162 | 240 | 57 | 930 | 800 | 9 | 3.0 | 10 | 83.4% | 1.5% |
| Example 18 | 162 | 225 | 72 | 930 | 800 | 9 | 3.0 | 10 | 73.3% | −10.8 |
| Example 19 | 162 | 210 | 87 | 930 | 800 | 9 | 3.0 | 10 | 65.2% | −20.7% |

*Portland Cement is Cruz Azul CPC 40
**The percent increase (%) is relative to the control

TABLE 10

| | Water (kg) | Portland Cement* (kg) | Ground Slate (kg) | Gravel (kg) | Sand (kg) | Slump (cm) | Additive (kg) | Duration (days) | % of Target Compressive strength | % Increase of Compressive Strength** |
|---|---|---|---|---|---|---|---|---|---|---|
| Control | 180 | 300 | — | 950 | 800 | 9 | — | 10 | 80.6% | — |
| Example 20 | 162 | 240 | 57 | 950 | 800 | 9 | 3.0 | 10 | 88.4% | 9.6% |
| Example 21 | 162 | 225 | 72 | 950 | 800 | 9 | 3.0 | 10 | 77.9 | −3.3% |
| Example 22 | 162 | 210 | 87 | 950 | 800 | 9 | 3.0 | 10 | 70.4 | −12.7% |

*Portland Cement is Cruz Azul CPC 40
**The percent increase (%) is relative to the control

TABLE 11

| | Water (kg) | Portland Cement* (kg) | Ground Basalt (kg) | Gravel (kg) | Sand (kg) | Slump (cm) | Additive (kg) | Duration (days) | % of Target Compressive Strength | % Increase of Compressive Strength** |
|---|---|---|---|---|---|---|---|---|---|---|
| Control | 180 | 300 | — | 950 | 800 | 12 | — | 10 | 86.3% | — |
| Example 23 | 162 | 240 | 57 | 950 | 800 | 12 | 3.0 | 10 | 96.6% | 11.9% |
| Example 24 | 162 | 225 | 72 | 950 | 800 | 12 | 3.0 | 10 | 85.1% | −1.4% |
| Example 25 | 162 | 210 | 87 | 950 | 800 | 12 | 3.0 | 10 | 75.2% | −12.8% |

*Portland Cement is Cruz Azul CPC 40
**The percent increase (%) is relative to the control

TABLE 12

| | Water (kg) | Portland Cement* (kg) | Pozzolanic Fly Ash (kg) | Gravel (kg) | Sand (kg) | Slump (cm) | Additive (kg) | Duration (days) | % of Target Compressive Strength | % Increase of Compressive Strength** |
|---|---|---|---|---|---|---|---|---|---|---|
| Control | 180 | 300 | — | 950 | 800 | 10 | — | 10 | 89.2% | — |
| Example 26 | 162 | 240 | 57 | 950 | 800 | 10 | 3.0 | 10 | 98.4% | 10.3% |
| Example 27 | 162 | 225 | 72 | 950 | 800 | 10 | 3.0 | 10 | 93.1% | 4.4% |
| Example 28 | 162 | 210 | 87 | 950 | 800 | 10 | 3.0 | 10 | 85.8% | −3.8% |

*Portland Cement is Cruz Azul CPC 40
**The percent increase (%) is relative to the control The cylinders of concrete were allowed to cure for a period of 10 days and the compressive strength of each of the cylinders was tested using a compressive strength cylinder-testing device. The compressive strengths of the cylinders are shown in Tables 9-12. As can be seen from the tables, the additive-containing Examples with the various filler materials had similar compressive strengths to the related control concretes up to certain concentrations of the filler material, after which the compressive strength began to diminish. It is noteworthy that the Crux Azul CPC 40 cement is not pure Portland cement and already contains significant portions of other materials, although the exact components of the Cruz Azul CPC 40 cement is unknown. Thus, the amount of Portland cement in each of the examples is unknown. However, it the Examples make clear that the amount of Portland cement can be meaningfully reduced while maintaining acceptable compressive strength characteristics by using the additive of the invention.

Examples 29-44

Enhanced Concretes with Various Additive Concentrations

Enhanced concretes and related control concretes (without additive) were made using the components as outlined in Tables 13-15. The example concretes were made by replacing an amount of the Portland cement used in the control with an amount of additive and fly ash. The additive used in Examples 29-44 is compositionally similar to the additive manufactured in Example 1.

TABLE 13

|  | Water (grams) | Portland Cement* (grams) | Gravel (grams) | Sand (grams) | Slump (inches) | Additive (grams) | Duration (days) | Compressive Strength (PSI) |
|---|---|---|---|---|---|---|---|---|
| Control | 2566 | 5970 | 11517 | 23373 | — | 0.00 | 10 | 1879 |
| Example 29 | 2566 | 5970 | 11517 | 23373 | — | 358.2 | 12 | 53 |
| Example 30 | 2566 | 4776 | 11517 | 23373 | — | 286.5 | 11 | 53 |

*Portland cement is ordinary Portland cement (OPC)
**The percent increase (%) is relative to the control

TABLE 14

|  | Water (grams) | Portland Cement* (grams) | Gravel (grams) | Sand (grams) | Slump (inches) | Additive (grams) | Duration (days) | Compressive Strength (PSI) | % Increase of Compressive Strength*** |
|---|---|---|---|---|---|---|---|---|---|
| Control | 3352 | 5970 | 11517 | 23373 | 4 | — | 16 | 2794 | — |
| Example 31 | 3352 | 5970 | 11517 | 23373 | 5.75 | 23.88 | 16 | 3254 | 16.46% |
| Example 32 | 3352 | 5970 | 11517 | 23373 | 5.75 | 29.85 | 16 | 2582** | −7.59%** |
| Example 33 | 3352 | 5970 | 11517 | 23373 | 5.75 | 35.82 | 16 | 3537 | 26.59% |
| Example 34 | 3352 | 5970 | 11517 | 23373 | 5.75 | 41.79 | 16 | 3572 | 27.85% |
| Example 35 | 3352 | 5970 | 11517 | 23373 | 5.75 | 47.76 | 16 | 3643 | 30.39% |
| Example 36 | 3352 | 5970 | 11517 | 23373 | 5.75 | 53.73 | 16 | 3643 | 30.39% |
| Example 37 | 3352 | 5970 | 11517 | 23373 | 5.75 | 59.70 | 16 | 3855 | 37.97 |

*Portland cement is ordinary Portland cement (OPC)
**This was a failed cylinder
***The percent increase (%) is relative to the control

TABLE 15

|  | Water (grams) | Portland Cement* (grams) | Gravel (grams) | Sand (grams) | Slump (inches) | Additive (grams) | Duration (days) | Compressive Strength (PSI) | % Increase of Compressive Strength*** |
|---|---|---|---|---|---|---|---|---|---|
| Control | 3063 | 5970 | 11517 | 23373 | 3.5 | — | 17 | 3218 | — |
| Example 38 | 2609 | 5970 | 11517 | 23373 | 2.75 | 65.67 | 17 | 4064 | 26.38% |
| Example 39 | 2609 | 5970 | 11517 | 23373 | 2.75 | 71.64 | 17 | 4421 | 37.38% |
| Example 40 | 2609 | 5970 | 11517 | 23373 | 2.75 | 77.61 | 17 | 4492 | 39.59% |
| Example 41 | 2609 | 5970 | 11517 | 23373 | 2.75 | 83.58 | 17 | 4669 | 45.09% |
| Example 42 | 2609 | 5970 | 11517 | 23373 | 2.75 | 59.55 | 17 | 4279 | 32.97% |
| Example 43 | 2609 | 5970 | 11517 | 23373 | 2.75 | 119.40 | 17 | 4775 | 48.38% |
| Example 44 | 2609 | 5970 | 11517 | 23373 | 2.75 | 179.10 | 17 | 50** | −98.45%** |

*Portland cement is ordinary Portland cement (OPC)
**This was a failed cylinder
***The percent increase (%) is relative to the control The example and control concretes were made using standard concrete manufacturing techniques. The cement, sand, and gravel were placed in a standard cement mixer, the mixer was turned on, and the water was slowly added while the mixer was turning. For the example concretes, the additive was added to the concrete while the concrete was mixing in the cement mixer and the concrete and the additive were allowed to mix thoroughly to yield the enhanced concrete examples. The slump of each of the control and example concretes was tested using industry standard slump testing techniques (ASTM C143/C143M—10a). Once the concrete's desired slump was determined and attained, the concrete (both example and control) was filled into compression test cylinders according to industry standard techniques (ASTM 0873/0873M—10a).

The filled cylinders were allowed to cure for varying periods (see Tables 13 and 14) and the compressive strength of each of the cylinders was tested using a compressive strength cylinder-testing device. The compressive strengths of the cylinders are shown in Tables 13-15. As can be seen from the table, the strength enhancing properties of the additive continue increasing to a certain concentration or dosing amount and then the strength enhancing properties not only diminish but actually begin to negatively impact the overall compressive strength of the concretes. This is pattern is also shown in FIG. 1. Based on the test results, the point at which the positive enhancement ceases and the negative impact on the compressive strength begins is somewhere between 2 wt % and 3 wt % of additive based on the amount of cement in the concrete.

Examples 45-57

Enhanced Concrete Having a 20% and 30% Reduction of Portland Cement Replaced with Fly Ash Enhanced concretes and related control concretes (without additive) were made using the components as outlined in Tables 16-19. The example concretes were made by replacing an amount of the Portland cement used in the control with an amount of additive and fly ash. The additive used in Examples 45-57 is compositionally similar to the additive manufactured in Example 1.

TABLE 16

| | Water (grams) | Portland Cement* (grams) | Fly Ash (grams) | Gravel (grams) | Sand (grams) | Slump (inches) | Additive (grams) | Duration (days) | Compressive Strength (PSI) | % Increase of Compressive Strength*** |
|---|---|---|---|---|---|---|---|---|---|---|
| Control | 2566 | 5970 | — | 11517 | 23373 | — | 0.00 | 10 | 1879 | — |
| Example 45 | 2566 | 4776 | 1194 | 11517 | 23373 | — | 0.00 | 10 | 1491** | −20.64%** |
| Example 46 | 2647 | 4776 | 1194 | 11517 | 23373 | — | 35.82 | 9 | 4474 | 200.07% |
| Example 47 | 2647 | 4776 | 1194 | 11517 | 23373 | — | 28.66 | 8 | 3858 | 158.75% |

*Portland cement is ordinary Portland cement (OPC)
**This Example is a control with fly ash but not additive
***The percent increase (%) is relative to the control

TABLE 17

| | Water (grams) | Portland Cement* (grams) | Fly Ash (grams) | Gravel (grams) | Sand (grams) | Slump (inches) | Additive (grams) | Duration (days) | Compressive Strength (PSI) | % Increase of Compressive Strength** |
|---|---|---|---|---|---|---|---|---|---|---|
| Control | 3370 | 4776 | 1194 | 11517 | 23373 | 3 | 0.00 | 13 | 1821 | — |
| Example 48 | 3051 | 4776 | 1194 | 11517 | 23373 | 3 | 35.82 | 13 | 2624 | 44.1% |
| Example 49 | 3051 | 4776 | 1194 | 11517 | 23373 | 3 | 35.82 | 13 | 2609 | 43.27% |

*Portland cement is ordinary Portland cement (OPC)
**The percent increase (%) is relative to the control

TABLE 18

| | Water (grams) | Portland Cement* (grams) | Fly Ash (grams) | Gravel (grams) | Sand (grams) | Slump (inches) | Additive (grams) | Duration (days) | Compressive Strength (PSI) | % Increase of Compressive Strength** |
|---|---|---|---|---|---|---|---|---|---|---|
| Control | 2566 | 4776 | 1194 | 11517 | 23373 | 3.25 | 0.00 | 10 | 1491 | — |
| Example 50 | 2639 | 4776 | 1194 | 11517 | 23373 | 3.25 | 35.82 | 10 | 2639 | 77.00% |

*Portland cement is ordinary Portland cement (OPC)
**The percent increase (%) is relative to the control

TABLE 19

| | Water (grams) | Portland Cement* (grams) | Fly Ash (grams) | Gravel (grams) | Sand (grams) | Slump (inches) | Additive (grams) | Duration (days) | Compressive Strength (PSI) | % Increase of Compressive Strength** |
|---|---|---|---|---|---|---|---|---|---|---|
| Control | 2912 | 5970 | — | 11517 | 23373 | 3.5 | 0.00 | 16 | 1592 | — |
| Example 51 | 2912 | 4179 | 1791 | 11517 | 23373 | 3.5 | 20.89 | 16 | 1910 | 19.97% |
| Example 52 | 2912 | 4179 | 1791 | 11517 | 23373 | 5.5 | 29.25 | 16 | 2016 | 26.63% |
| Example 53 | 2912 | 4179 | 1791 | 11517 | 23373 | 5.5 | 37.61 | 16 | 1981 | 24.43% |

TABLE 19-continued

|  | Water (grams) | Portland Cement* (grams) | Fly Ash (grams) | Gravel (grams) | Sand (grams) | Slump (inches) | Additive (grams) | Duration (days) | Compressive Strength (PSI) | % Increase of Compressive Strength** |
|---|---|---|---|---|---|---|---|---|---|---|
| Example 54 | 2912 | 4179 | 1791 | 11517 | 23373 | 5.5 | 46.16 | 16 | 2157 | 35.49% |
| Example 55 | 2912 | 4179 | 1791 | 11517 | 23373 | 5.5 | 54.56 | 16 | 2264 | 42.21% |
| Example 56 | 2912 | 4179 | 1791 | 11517 | 23373 | 5.5 | 62.96 | 16 | 2370 | 48.87% |
| Example 57 | 2912 | 4179 | 1791 | 11517 | 23373 | 5.5 | 71.35 | 16 | 2511 | 57.73% |

*Portland cement is ordinary Portland cement (OPC)
**The percent increase (%) is relative to the control The example and control concretes were made using standard concrete manufacturing techniques. The cement, sand, gravel, and fly ash were placed in a standard cement mixer, the mixer was turned on, and the water was slowly added while the mixer was turning. For the example concretes, the additive was added to the concrete while the concrete was mixing in the cement mixer and the concrete and the additive were allowed to mix thoroughly to yield the enhanced concrete examples. The slump of each of the control and example concretes was tested using industry standard slump testing techniques (ASTM C143/C143M—10a). Once the concrete's desired slump was determined and attained, the concrete (both example and control) was filled into compression test cylinders according to industry standard techniques (ASTM 0873/0873M—10a).

The filled cylinders were allowed to cure for varying periods (see Tables 13 and 14) and the compressive strength of each of the cylinders was tested using a compressive strength cylinder-testing device. The compressive strengths of the cylinders are shown in Tables 16-18. As can be seen from the tables, when 20% of the Portland cement is replaced with fly ash and the concrete is dosed with the additive the concrete has significant compressive strength increases as compared to equivalent concretes with no fly ash (See Table 16) and as compared to equivalent concretes with fly ash (See Tables 17 and 18). Similarly, when 30 wt % of the Portland cement is replaced with fly ash and the concrete is dosed with the additive, these concretes also exhibit significant compressive strength increases (see Table 18). It is noteworthy that the compressive strength increases correlate to the amount of additive added to the concrete, although, as discussed in Examples 29-44, at some dosing point the benefit of the additive falls off and can actually reduce compressive strength of the concrete. This pattern of compressive strength increases is also shown in FIG. 1.

Examples 58-62

Enhanced Concrete Having 80% Reduction of Portland Cement Replaced with Fly Ash

Enhanced concretes and related control concretes (without additive) were made using the components as outlined in Table 20. The example concretes were made by replacing an amount of the Portland cement used in the control with an amount of additive and fly ash. The additive used in Examples 58-62 is compositionally similar to the additive manufactured in Example 1.

TABLE 20

|  | Water (grams) | Portland Cement* (grams) | Fly Ash (grams) | Gravel (grams) | Sand (grams) | Slump (inches) | Additive (grams) | Duration (days) | Compressive Strength (PSI) | % Increase of Compressive Strength** |
|---|---|---|---|---|---|---|---|---|---|---|
| Control | 2521 | 1194 | — | 11517 | 23373 | 3.5 | 0.00 | 42 | 934 | — |
| Example 58 | 2592 | 1194 | 4776 | 11517 | 23373 | 3.5 | 35.83 | 42 | 1130 | 20.99% |
| Example 59 | 2560 | 1194 | 4776 | 11517 | 23373 | 3.5 | 7.16 | 42 | 853 | −8.67% |
| Example 60 | 2828 | 1194 | 4776 | 11517 | 23373 | 3.5 | 7.16 | 41 | 872 | −6.64% |
| Example 61 | 3200 | 1194 | 4776 | 11517 | 23373 | 3.5 | 21.49 | 41 | 1132 | 21.2% |
| Example 62 | 2140 | 1194 | 4776 | 11517 | 23373 | 3.5 | 59.7 | 41 | 1235 | 32.23% |

*Portland cement is ordinary Portland cement (OPC)
**The percent increase (%) is relative to the control The example and control concretes were made using standard concrete manufacturing techniques. The cement, sand, gravel, and fly ash were placed in a standard cement mixer, the mixer was turned on, and the water was slowly added while the mixer was turning. For the example concretes, the additive was added to the concrete while the concrete was mixing in the cement mixer and the concrete and the additive were allowed to mix thoroughly to yield the enhanced concrete examples. The slump of each of the control and example concretes was tested using industry standard slump testing techniques (ASTM C143/C143M—10a). Once the concrete's desired slump was determined and attained, the concrete (both example and control) was filled into compression test cylinders according to industry standard techniques (ASTM 0873/0873M—10a).

The filled cylinders were allowed to cure for 41-42 days and the compressive strength of each of the cylinders was tested using a compressive strength cylinder-testing device. The compressive strengths of the cylinders are shown in Table 20. As can be seen from the table, when 80% of the Portland cement is replaced with fly ash and the concrete is dosed at greater than 0.12% additive (based on the sum of the amounts of cement and fly ash in the in the concrete; Examples 59 and 60 were dosed with 0.12% additive based on the amounts of Portland cement and fly in the concrete), the concrete has significant compressive strength increases as compared to equivalent concretes with no fly ash. Examples 59 and 60 seem to indicate that there is a negative effect on the concrete when the additive is not dosed in adequate amounts, e.g. greater than 0.12 wt % based on sum amounts of Portland cement and fly ash.

Examples 63-68

Enhanced Concrete Having Varying Amounts of Portland Cement Replaced with Fly Ash Enhanced concretes and related control concretes (without additive) were made using the components as outlined in Tables 21 and 22. The example concretes were made by replacing an amount of the Portland cement used in the control with an amount of additive and fly ash. The additive used in the control and Examples 63-65 and 67-68 is compositionally similar to the additive manufactured in Example 1.

concrete was mixing in the cement mixer and the concrete and the additive were allowed to mix thoroughly to yield the enhanced concrete examples. The slump of each of the control and example concretes was tested using industry standard slump testing techniques (ASTM C143/C143M—10a). Once the concrete's desired slump was determined and attained, the concrete (both example and control) was filled into compression test cylinders according to industry standard techniques (ASTM 0873/0873M—10a).

The filled cylinders were allowed to cure for 18 days and the compressive strength of each of the cylinders was tested using a compressive strength cylinder-testing device. The compressive strengths of the cylinders are shown in Tables 21 and 22. The results of the testing seems to indicate that the amount of additive dosed to a particular concrete should be based on the sum of the amounts of Portland cement and fly ash present in the concrete. When 50% of the Portland cement is replaced with fly ash and the additive is dosed at 0.45% and 0.9% by weight of the sum of the cement and fly ash the strength of the concrete is enhanced.

Examples 69-71

Various Additive-Dosed Concretes

Various additive dosed concretes and a control concrete (without additive) were made using the components as outlined in Tables 23. The example concretes were made by

TABLE 21

|  | Water (grams) | Portland Cement* (grams) | Fly Ash (grams) | Gravel (grams) | Sand (grams) | Slump (inches) | Additive (grams) | Additive as percent of Cement | Duration (days) | Compressive Strength (PSI) |
|---|---|---|---|---|---|---|---|---|---|---|
| Control | 3094 | 5970 | — | 11517 | 23373 | 3.25 | 53.73 | 0.9% | 18 | 3289 |
| Example 63 | 2952 | 4776 | 1194 | 11517 | 23373 | 5 | 42.98 | 0.9% | 18 | 3183 |
| Example 64 | 3074 | 3582 | 2388 | 11517 | 23373 | 4 | 32.24 | 0.9% | 18 | 2016 |
| Example 65 | 2618 | 2338 | 3582 | 11517 | 23373 | 5 | 21.49 | 0.9% | 18 | 990 |

*Portland cement is ordinary Portland cement (OPC)
**The percent increase (%) is relative to the control

TABLE 22

|  | Water (grams) | Portland Cement* (grams) | Fly Ash (grams) | Gravel (grams) | Sand (grams) | Slump (inches) | Additive (grams) | Additive (% of sum of Cement and fly ash) | Duration (days) | Compressive Strength (PSI) | % Increase of Compressive Strength** |
|---|---|---|---|---|---|---|---|---|---|---|---|
| Example 66 | 2653 | 2985 | 2985 | 11517 | 23373 | 4 | 0.00 | — | 18 | 1238 | — |
| Example 67 | 3074 | 2985 | 2985 | 11517 | 23373 | 3 | 26.87 | 0.45% | 18 | 1556 | 25.68% |
| Example 68 | 2653 | 2985 | 2985 | 11517 | 23373 | 5 | 53.73 | 0.9% | 18 | 1662 | 34.25% |

*Portland cement is ordinary Portland cement (OPC)
**The percent increase (%) is relative to the Example 66

The example and control concretes were made using standard concrete manufacturing techniques. The cement, sand, gravel, and fly ash were placed in a standard cement mixer, the mixer was turned on, and the water was slowly added while the mixer was turning. For the example concretes, the additive was added to the concrete while the replacing an amount of the Portland cement used in the control with an amount of additive and fly ash. The additive used in Examples 69 and 71 is compositionally similar to the additive manufactured in Example 1. The additive used in Example 70 is also compositionally similar but was not dried during its preparation process.

TABLE 23

| | Water (grams) | Portland Cement* (grams) | Fly Ash (grams) | Gravel (grams) | Sand (grams) | Slump (inches) | Additive (grams) | Duration (days) | Compressive Strength (PSI) | % Increase of Compressive Strength**** |
|---|---|---|---|---|---|---|---|---|---|---|
| Control | 2647 | 4776 | 1194 | 11517 | 23373 | — | 0.00 | 8 | 3179 | — |
| Example 69 | 2647 | 4776 | 1194 | 11517 | 23373 | — | 35.82 | 7 | 5347 | 68.2% |
| Example 70 | 2647 | 4776 | 1194 | 11517 | 23373 | — | 35.82** | 7 | 4309 | 35.55% |
| Example 71 | 2647 | 4776 | 1194*** | 11517 | 23373 | — | 28.68 | 6 | 3162 | −0.53% |

*Portland cement is ordinary Portland cement (OPC)
**Additive was wet (not dried) mixture of the additive components
***Rather than fly ash an equivalent amount of a powdered mineral filler was used
****The percent increase (%) is relative to the control The example and control concretes were made using standard concrete manufacturing techniques. The cement, sand, gravel, and fly ash were placed in a standard cement mixer, the mixer was turned on, and the water was slowly added while the mixer was turning. For the example concretes, the additive was added to the concrete while the concrete was mixing in the cement mixer and the concrete and the additive were allowed to mix thoroughly to yield the enhanced concrete examples. The slump of each of the control and example concretes was tested using industry standard slump testing techniques (ASTM C143/C143M—10a). Once the concrete's desired slump was determined and attained, the concrete (both example and control) was filled into compression test cylinders according to industry standard techniques (ASTM 0873/0873M—10a).

The filled cylinders were allowed to cure for between 6 and 8 days and the compressive strength of each of the cylinders were tested using a compressive strength cylinder-testing device. The compressive strengths of the cylinders are shown in Table 23. Example 69 utilized an additive that was dried and ground to a powder, Example 70 used a compositionally similar additive that had not been dried and ground. The dried and ground additive produced nearly twice as much increase in compressive strength as the wet (non-dried) additive. Example 71 utilized a powdered mineral filler rather than fly ash as the filler material. The testing shows that the mineral filler can be used in combination with the additive to produce a concrete having virtually identical compressive strength as the control concrete.

Examples 72-77

Enhanced Concretes with Filler Materials

A number of enhanced concretes with filler materials were made using the components as outlined in Tables 24. The example concretes were made by replacing an amount of the Portland cement used in the control with an amount of additive and fly ash or finely powdered sand. The additive used in Examples 72-77 is compositionally similar to the additive manufactured in Example 1.

TABLE 24

| | Water (grams) | Portland Cement* (grams) | Fly Ash (grams) | Gravel (grams) | Sand (grams) | Slump (inches) | Additive (grams) | Duration (days) | Compressive Strength (PSI) | % Change in Compressive Strength** |
|---|---|---|---|---|---|---|---|---|---|---|
| Control | 2064 | 3184 | 796 | 7678 | 15582 | 3 | 0 | 15 | 1981 | — |
| Example 72 | 2064 | 3184 | 796 | 7678 | 15582 | 4.5 | 28.66 | 15 | 2370 | 19.64% |
| Example 73 | 2204 | 3184 | 0 | 7678 | 15582 | 3 | 0 | 15 | 1238 | −37.51% |
| Example 74 | 2043 | 2388 | 796 | 7678 | 16378 | 3.5 | 21.49 | 15 | 1026 | −48.21% |
| Example 75 | 2286 | 3184 | 0 | 7678 | 16378 | 3.5 | 28.66 | 15 | 1910 | −3.58% |
| Example 76 | 2204 | 3184 | 0 | 7678 | 15582 | 4.5 | 28.66 | 15 | 1768 | −10.75% |
| Example 77 | 2335 | 2388 | 0 | 7678 | 17174 | 3 | 21.49 | 15 | 672 | −66.08% |

*Portland cement is ordinary Portland cement (OPC)
**The percent increase (%) is relative to the control The example and control concretes were made using standard concrete manufacturing techniques. The cement, sand, gravel, fly ash, and when utilized, the additional sand were placed in a standard cement mixer, the mixer was turned on, and the water was slowly added while the mixer was turning. For the example concretes, the additive, or additive component, was added to the concrete while the concrete was mixing in the cement mixer and the concrete and the additive were allowed to mix thoroughly to yield the enhanced concrete examples. The slump of each of the control and example concretes was tested using industry standard slump testing techniques (ASTM C143/C143M—10a). Once the concrete's desired slump was determined and attained, the concrete (both example and control) was filled into compression test cylinders according to industry standard techniques (ASTM 0873/0873M—10a).

The filled cylinders were allowed to cure for 15 days and the compressive strength of each of the cylinders was tested using a compressive strength cylinder-testing device. As can be seen from comparing the results of Examples 72 and 75, the fly ash can be replaced with finely ground sand and additive and approximately the same compressive strength can be achieved as compared to the control, although there is a difference in the compressive strength as compared to an equivalent concrete (Example 72) with fly ash and the additive.

Examples 77-80

Effects of Drying Temperature on Additive Potency

The drying temperature of the additive was varied in order to determine its effect on the potency of the additive, i.e. the ability of the additive to increase the compressive strength of concrete. Various additive dosed concretes were made using the components as outlined in Tables 25. Example 77 has no additive. The additive used in Example 78 was dried at 200° F. (93.3° C.) in a convection oven with occasional stirring and breaking up of the drying additive. The additive used in Example 79 was dried at 300° F. (148.9° C.) in a convection oven with occasional stirring and breaking up of the drying additive. The additive used in Example 80 was dried at 220° F. (104.4° C.) in a convection oven with occasional stirring and breaking up of the drying additive. The additive used in Example 80 was made in a similar manner described in Example 1 except that an extra 5 wt % of molasses was added to the additive, thereby making the concentration of molasses in the additive higher than Example 78 and 79.

TABLE 25

| | Water (grams) | Portland Cement* (grams) | Gravel (grams) | Sand (grams) | Slump (inches) | Additive (grams) | Duration (days) | Compressive Strength (PSI) | % Change of Compressive Strength** |
|---|---|---|---|---|---|---|---|---|---|
| Example 77 | 3236 | 5970 | 11517 | 23373 | 4.0 | 0 | 15 | 3218 | — |
| Example 78 | 2217 | 3980 | 7678 | 15582 | 4.5 | 35.82 | 15 | 2971 | −7.68% |
| Example 79 | 3079 | 5970 | 11517 | 23373 | 3.0 | 53.73 | 15 | 4226 | 31.32% |
| Example 80 | 2823 | 5970 | 11517 | 23373 | 2.75 | 53.73 | 15 | 4669 | 45.09% |

*Portland cement is ordinary Portland cement (OPC)
**Increase in compressive strength based on comparison to Example 77

The example concretes were made using standard concrete manufacturing techniques. The cement, sand, gravel, fly ash, and when utilized, the additional sand were placed in a standard cement mixer, the mixer was turned on, and the water was slowly added while the mixer was turning. The additive, or additive component, was added to the concrete while the concrete was mixing in the cement mixer and the concrete and the additive were allowed to mix thoroughly to yield the enhanced concrete examples. The slump of each of the concretes was tested using industry standard slump testing techniques (ASTM C143/C143M—10a). Once the concrete's desired slump was determined and attained, the concrete (both example and control) was filled into compression test cylinders according to industry standard techniques (ASTM C873/C873M—10a).

The filled cylinders were allowed to cure for between 15 days and the compressive strength of each of the cylinders was tested using a compressive strength cylinder-testing device. It was noted that the compressive strength of the additive dried at 220° F. (104.4° C.) had a significantly greater enhancement effect on the compressive strength than the additive that was dried at only 200° F. (93.3° C.). Conversely, the additive that was dried at 300° F. (148.9° C.) had a reduction in potency as compared to the additive dried at 200° F. (93.3° C.). Further, it was observed that the additive that had 5 wt % more molasses than the other additives acted to increase the compressive strength in a manner that is analogous to adding extra additive using an additive with less wt % molasses.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The invention claimed is:

1. A method of manufacturing an enhanced Portland cement for use in the preparation of a concrete having enhanced compressive strength, comprising:
admixing Portland cement with an additive following formation of clinker where admixing is accomplished by spraying the additive onto the clinker having an elevated temperature, wherein the additive comprises molasses and a carrier, and wherein the Portland cement and the additive are present in the enhanced Portland cement at a ratio of additive to Portland cement of about 1:1000 (w/w) to about 1:25 (w/w), wherein the carrier comprises water.

2. The method of claim 1, wherein the Portland cement and the additive are present in the enhanced Portland cement at a ratio of additive to Portland cement of about 0.4:250 (w/w) to about 1:39 (w/w).

3. The method of claim 1, wherein the carrier includes a member selected from the group consisting of fly ash, shale, slate, limestone, basalt, rhyolite, volcanic ash, ash, and combinations thereof.

4. The method of claim 1, wherein a ratio of the amount (wt %) of the water to the amount (wt %) of molasses is about 1:99 and 99:0.1.

5. The method of claim 1, wherein the step of admixing occurs during the manufacturing of the Portland cement.

6. The method of claim 1, wherein the elevated temperature is less than about 275° F.

7. The method of claim 1, wherein the admixing occurs during grinding of clinker into powdered Portland cement.

8. The method of claim 1, wherein the molasses has a Brix value of at least 65.

* * * * *